E. TILTON.
SAFETY LOCK JOINT.
APPLICATION FILED APR. 11, 1921.
1,425,724.
Patented Aug. 15, 1922
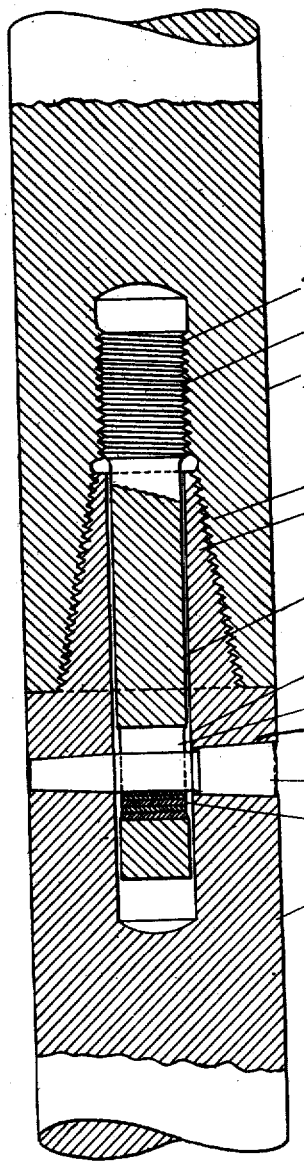
FIG. 1.
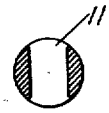
FIG. 8.
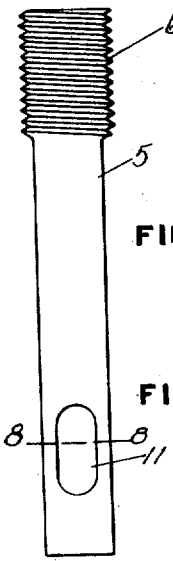
FIG. 2.
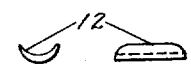
FIG. 6. FIG. 4.
FIG. 7. FIG. 5.
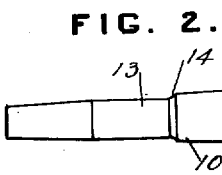
FIG. 3.
INVENTOR
Elvin Tilton
by William B. Wharton
his attorney

UNITED STATES PATENT OFFICE.

ELVIN TILTON, OF ENCAMPMENT, WYOMING, ASSIGNOR, BY MESNE ASSIGNMENTS, TO PENNSYLVANIA-KENTUCKY OIL AND GASOLINE REFINING COMPANY, OF WHEELING, WEST VIRGINIA, A CORPORATION OF DELAWARE.

SAFETY LOCK JOINT.

1,425,724.      Specification of Letters Patent.     Patented Aug. 15, 1922.

Application filed April 11, 1921. Serial No. 460,335.

*To all whom it may concern:*

Be it known that I, ELVIN TILTON, a citizen of the United States, and resident of Encampment, in the county of Carbon and State of Wyoming, have invented a new and useful Improvement in a Safety Lock Joint, of which the following is a specification.

This invention relates to a safety lock joint which may be utilized in general for securing a bit or the like to a shaft or for mutually securing two shafts. More particularly the lock joint of the present invention is adapted for use as applied to drill bits and other drilling tools.

During drilling operations great loss is frequently occasioned by the separation of the drill bit, fishing tool, or the like, from the stem to which it is attached. In drilling, any slight unscrewing of the tool from tight engagement with its stem permits battering of the threads, which may result either in immediate loss through stripping of the threads or ultimate fracture of the joint because of crystallization.

Numerous attempts have been made to provide devices for avoiding this difficulty. These devices have been unsatisfactory because they have been too complicated or inapplicable to tools of all designs; because they did not provide the positive lock desired; and because they have been of such structure as to be unusable after rethreading of the tool or the stem to which it is applied.

One object of the invention is to provide means which are strong, simple, and positive in their operation for locking a bit or the like to a shaft or for mutually locking two shafts; and particularly to provide locking means of this nature which are well adapted for locking a drill bit or other drilling tool to the shaft or stem to which it is applied.

Another object of the invention is to provide locking means which have therein no approximately square corners to form burrs or shoulders under constant hammering.

Further objects of the invention are to provide a locking device which, because of the close engagement it maintains, lessens the frequency with which the connected members need be rethreaded; and which also permits rethreading of the connected members without destroying the utility of the device, should such rethreading become necessary.

A still further object of the invention is to provide an arrangement in which the extent of open spaces within the members is minimized, and which is closed at all points against the entry of water or grit.

In the accompanying drawings Fig. 1 is a vertical section through a drill bit and stem, showing the same connected and with the locking device of the present invention in position therein; Fig. 2 is a detail elevation of the locking rod of the device; Fig. 3 is a detail elevation of the fastening pin therefor; Figs. 4 and 5 are side views of the form of shim utilized in the device; Figs. 6 and 7 are end views of the shims shown in Figs. 4 and 5 respectively, and Fig. 8 is a cross sectional view on the line 8—8 Fig. 2.

In the drawings the reference numeral 1 designates a drill bit, and 2 the stem to which it is attached by means of a threaded cone 3 engaging in a threaded socket 4 in the base of the stem.

The locking means comprise primarily a rod 5 having a screw threaded terminal 6 engaging in a socket 7 provided inwardly of the main socket 4, together with means for securing the rod 5 to the drill bit 1. The terminal 6 and socket 7 are provided with threads opposite to those of the cone 3 and socket 4, so that any tendency of the bit to unscrew in its socket is met and checked by the engagement of the locking rod in the stem.

The means for securing the locking rod 5 to the bit 1 are likewise simple. The bit is provided with a longitudinally extending and centrally disposed orifice 8, which extends downwardly from the apex of cone 3 and which receives the locking rod 5. The bit is also provided with a diametric orifice 9 for the reception of a fastening pin 10, and the shank of rod 5 is provided with a slot 11 arranged to match with the orifice 9.

It is necessary in order to engage and securely lock the parts that the fastening pin 10 securely hold the rod 5 in position, and also that the slot 11 be caused to match with orifice 9 for the reception of the pin. It is also a practical necessity for satisfactory service that the same locking action be secured after the bit or stem have been rethreaded. This purpose is effected by making the slot 11 in rod 5 of an elongated shape, and by providing means for causing the pin 10 to so engage therein as to prevent upward movement of the locking rod in the bit.

In securing the drill bit to the stem, the shank of rod 5 is inserted into the central orifice 8 of bit 1, and its threaded portion 6 screwed into the socket 7. In order that the slot 11 in the rod shall then match with orifice 9 in the bit when the threaded portion 3 is screwed tightly into its socket 4, the pin 10, or any rod of suitable size is inserted through orifice 9 and slot 11, which have previously been brought into register. This may be done at any stage of screwing together the bit and stem, but for the sake of convenience is preferably during the last revolution required to screw portion 3 tightly into its socket 4. The operation of screwing the members together tightly is then completed, and it will be seen that this action will unscrew rod portion 6 any amount that may be necessary to maintain accurate alignment of the slot and orifice. It will be noted that this adjustment is possible because of the elongated shape of slot 11.

When the members have been screwed tightly together, with the orifice 9 and slot 11 properly matched, the pin is removed and filling means are inserted through orifice 9 and into slot 11. Some filling means are necessary in order to prevent the possibility of upward movement of the locking rod in the bit; because it will generally happen that a portion of the slot 11 will lie below the orifice 9, so that the final insertion of the pin will not completely prevent possibility of such movement. For this purpose one or more shims 12 are inserted through orifice 9 and dropped into slot 11 to fill in the slot to a point level with the orifice.

The shim or shims 12 used are of crescent shape suitable for fitting into slot 11 and for fitting the pin 10 when the latter is driven in. For the sake of convenience it is desirable that shims of varying thickness be used in assembling the device, as this decreases the number which need be used.

When the slot has been filled in this manner the fastening pin 10 is driven in to secure rod 5 to bit 1. Pin 10 is so formed that both end portions thereof taper with the same inclination. Intermediate these end portions is a portion 13 formed without inclination for entering the slot 11 in rod 5 and bearing against the shims 12 therein, and having an inclined shoulder 14 for wedging the pin in position. It will be understood that with the locking rod thus secured to bit 1 and held against upward movement therein, any tendency of the bit to unscrew in its socket is checked by the counter tendency to screw it in more tightly which is produced by the oppositely threaded terminal of the locking rod.

If, moreover, the main connection between the bit and stem should be fractured owing to crystallization or other causes, the locking rod and its fastening pin serve as secondary securing means for preventing loss of the bit.

It will be observed that with this structure the slot and orifice may be brought into register, and the pin driven in without accurately predetermining the position of the slot relatively to that of the orifice. Either the cone 3 or socket 4 may thus be rethreaded without destroying the functioning of the locking means. It should be further noted that the ends of slot 11 and the shim 12 are rounded, and that the pin 10 is circular in cross section. There are, therefore, no sharp edges to cause burrs or shoulders which would interfere with the removal of the fastening pin or with the assembly of the parts. Also, it is unnecessary to provide any means for locking the pin in position in the orifice of the bit and slot in the locking rod due to the frictional engagement secured by use of the shims and by the inclined shoulder on the pin.

Although the device of the present invention has been described as utilized in connection with a drill bit or other drilling tool, for which purpose it is primarily designed, it is applicable to any form of shaft connection or the like in which a safety lock joint is desired.

The elements of the device may, moreover, be reversed so that the locking rod has its screw threaded engagement in the tool member and is secured by a fastening pin or the like. The joint members may also, if desired, be made separate from the stem, bit, or shafts for use with which they are intended, and welded thereto when used. As the device is susceptible of these and other modifications without departing from the spirit of the invention, the scope of the invention is to be restricted only by the limitations contained in the claims appended hereto.

What I claim is:

1. A safety joint for mutually screw threaded members comprising an integral locking rod having a screw threaded connection in one of said members the threads of which are opposite to those of the members themselves, said locking rod being provided with a slot arranged to register with an orifice in the second screw threaded member during matching of the joint, means passing through said slot and orifice whereby the locking rod may be held to rotate with said second member and moved longitudinally to maintain said slot and orifice in register upon matching of the joint, and means for securing the locking rod to said second member arranged to prevent longitudinal movement of the rod under any tendency toward unscrewing of the joint.

2. A safety joint for mutually screw threaded members comprising an integral locking rod having a screw threaded connection in one of said members the threads of which are opposite to those of the members themselves, said locking rod being provided with a slot arranged to register with an orifice in the second screw threaded member during matching of the joint, means passing through said slot and orifice whereby the locking rod may be held to rotate with said second member and moved longitudinally to maintain said slot and orifice in register upon matching of the joint, the slot in the locking rod being of sufficient length to permit matching of said slot and orifice under variations in the threaded connection between the members themselves, and means for securing the locking rod to said second member arranged to prevent longitudinal movement of the rod under any tendency toward unscrewing of the joint.

3. A safety joint for mutually screw threaded members comprising an integral locking rod having a screw threaded connection in one of said members the threads of which are opposite to those of the members themselves and having a shank provided with an elongated slot arranged to enter a longitudinally disposed orifice in the other of said members, said last named member being provided with a substantially radial orifice with which the slot in said locking rod matches, a pin arranged to enter said rod orifice and slot, and means for filling the portion of said slot on one side of said pin, to provide an adjustable and rigid connection between the locking rod and the screw threaded member whereby the oppositely screw threaded connection of the locking rod prevents relative movement of the members.

4. A safety joint for mutually screw threaded members comprising an integral locking rod having a screw threaded connection in one of said members the threads of which are opposite to those of the members themselves and having a shank provided with an elongated slot arranged to enter a longitudinally disposed orifice in the other of said members, said last named member being provided with a substantially radial orifice with which the slot in said locking rod matches, a pin arranged to enter said rod orifice and slot, and curved shims arranged to fill the portion of the slot on one side of said pin, to provide an adjustable and rigid connection between the locking rod and the screw threaded member whereby the oppositely screw threaded member of the locking rod prevents relative movement of the members.

5. A safety joint for mutually screw threaded members comprising an integral locking rod having a screw threaded engagement in one of said members the threads of which are opposite to those of the members themselves, and means effective in various longitudinal positions of the locking rod relatively thereto for rigidly securing the locking rod to the other of said members; whereby the oppositely screw threaded engagement of the locking rod prevents relative movement of the members.

6. A safety lock joint for mutually screw threaded members comprising an integral locking rod having a screw threaded engagement in one of said members, the threads of said locking rod being opposite to the threads of the connection between the members themselves and having an elongated slot therein, a pin substantially filling a radial orifice in the other of said members and having a portion of uniform thickness arranged to pass through said slot and having its longitudinal axis at right angles to the longitudinal axis of the locking rod, and means arranged to fill the space in the slot on one side of the locking rod in various positions of the locking rod relatively to the pin and fit the contour of the pin.

7. A safety lock joint for mutually screw threaded members comprising a radially disposed pin having a fixed position in one of said members, a locking rod having a slot arranged to embrace the pin, said slot being materially longer than the dimension of the pin longitudinally of the locking rod, an engagement between the locking rod and the other screw threaded member arranged to permit longitudinal movement of the locking rod independently of the pin, and means for filling in the space in the slot on one side of the pin.

8. A safety lock joint for mutually screw threaded members comprising an integral locking rod having a screw threaded engagement in one of said members, the threads of said locking rods being opposite to the threads of the members themselves, a pin substantially filling a radial orifice in the other of said members, said locking rod having a slot arranged to embrace the pin and of sufficient length to permit material longitudinal movement of the locking rod relatively thereto, and means for filling the slot on one side of the pin to prevent movement of the rod under any tendency of the joint to unscrew and cause the rod to resist such tendency.

In witness whereof, I hereunto set my hand.

ELVIN TILTON.

Witness:
W. B. STONE.